(12) United States Patent
Stoyanov et al.

(10) Patent No.: US 11,313,281 B2
(45) Date of Patent: *Apr. 26, 2022

(54) GAS TURBINE ENGINE INCLUDING SEAL ASSEMBLY WITH ABRADABLE COATING INCLUDING MAGNETIC PARTICLES

(71) Applicant: Raytheon Technologies Corporation, Farmington, CT (US)

(72) Inventors: Pantcho P. Stoyanov, West Hartford, CT (US); Agnieszka M. Wusatowska-Sarnek, Manchester, CT (US); Thomas D. Kasprow, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,444

(22) Filed: Jul. 16, 2020

(65) Prior Publication Data

US 2022/0018291 A1  Jan. 20, 2022

(51) Int. Cl.
*F02C 7/06* (2006.01)
*F02C 7/28* (2006.01)

(52) U.S. Cl.
CPC .................. *F02C 7/28* (2013.01); *F02C 7/06* (2013.01); *F05D 2230/31* (2013.01); *F05D 2240/50* (2013.01); *F05D 2240/55* (2013.01); *F05D 2300/11* (2013.01); *F05D 2300/121* (2013.01); *F05D 2300/132* (2013.01); *F05D 2300/507* (2013.01); *F05D 2300/509* (2013.01); *F05D 2300/6111* (2013.01)

(58) Field of Classification Search
CPC .......... F02C 7/28; F02C 7/06; F05D 2220/32; F05D 2240/50; F05D 2240/55; F01D 25/183; F01D 25/186
See application file for complete search history.

(56) References Cited

U.S. PATENT DOCUMENTS

| 1,872,251 | A | * | 8/1932 | Cowin | F16C 33/80 384/480 |
| 3,068,016 | A | * | 12/1962 | Dega | F16J 15/3496 277/406 |
| 3,342,563 | A | * | 9/1967 | Butts | B22F 3/1112 75/246 |

(Continued)

FOREIGN PATENT DOCUMENTS

| DE | 102017130965 A1 | 6/2019 |
| GB | 2401409 A | 11/2004 |
| RU | 2570027 C2 | 10/2015 |

*Primary Examiner* — J. Todd Newton
*Assistant Examiner* — Theodore C Ribadeneyra
(74) *Attorney, Agent, or Firm* — Carlson, Gaskey & Olds, P.C.

(57) ABSTRACT

A gas turbine engine according to an exemplary aspect of the present disclosure includes, among other things, a compressor section, a combustor section, a turbine section, and at least one rotatable shaft. The engine further includes a seal assembly including a seal plate mounted for rotation with the rotatable shaft and a face seal in contact with the seal plate at a contact area. The seal assembly includes an abradable coating adjacent the contact area, and the abradable coating includes magnetic particles.

17 Claims, 3 Drawing Sheets

(56) References Cited

U.S. PATENT DOCUMENTS

| | | | | |
|---|---|---|---|---|
| 3,547,455 A * | 12/1970 | Edward | F01D 11/02 | 277/415 |
| 4,248,566 A * | 2/1981 | Chapman | F04D 27/0215 | 415/26 |
| 4,277,072 A * | 7/1981 | Forch | F16J 15/164 | 277/404 |
| 4,402,515 A * | 9/1983 | Malott | F16J 15/445 | 277/415 |
| 4,423,097 A * | 12/1983 | Mons | C22C 32/00 | 277/415 |
| 4,606,378 A * | 8/1986 | Meyer | F16L 1/123 | 138/103 |
| 5,499,901 A * | 3/1996 | Rockwood | F04D 29/061 | 277/412 |
| 6,073,358 A | 6/2000 | Nguyen | | |
| 6,113,482 A | 9/2000 | Licata | | |
| 6,338,578 B1 * | 1/2002 | Adde | F01D 25/162 | 384/537 |
| 6,443,698 B1 * | 9/2002 | Corattiyil | F01D 25/16 | 384/581 |
| 7,025,356 B1 * | 4/2006 | Cheung | F16J 15/445 | 277/303 |
| 7,998,604 B2 * | 8/2011 | Reynolds | C23C 30/00 | 428/701 |
| 8,794,922 B2 * | 8/2014 | Bart | F01D 25/162 | 416/170 R |
| 10,180,075 B1 | 1/2019 | Andrus et al. | | |
| 11,060,382 B2 * | 7/2021 | Sherman | E21B 29/10 | |
| 2002/0192494 A1 * | 12/2002 | Tzatzov | C23C 28/00 | 428/655 |
| 2004/0137259 A1 * | 7/2004 | Pabla | C23C 24/10 | 428/650 |
| 2004/0142196 A1 * | 7/2004 | Hajmrle | B22F 1/007 | 428/545 |
| 2006/0251512 A1 * | 11/2006 | Singh | F01D 25/183 | 415/174.5 |
| 2006/0267289 A1 * | 11/2006 | Li | F16J 15/445 | 277/347 |
| 2007/0177936 A1 * | 8/2007 | Servant | F02C 7/36 | 403/118 |
| 2008/0056890 A1 * | 3/2008 | Ivakitch | F01D 11/003 | 415/174.4 |
| 2009/0223052 A1 * | 9/2009 | Chaudhry | F02C 7/32 | 29/889.2 |
| 2009/0297083 A1 * | 12/2009 | Raberin | F02C 7/06 | 384/537 |
| 2010/0135785 A1 * | 6/2010 | Just | F02C 6/12 | 415/229 |
| 2011/0049809 A1 * | 3/2011 | Garrison | F01D 25/183 | 277/304 |
| 2011/0076151 A1 * | 3/2011 | Cui | B23K 1/0056 | 416/232 |
| 2011/0081235 A1 * | 4/2011 | Shah | F03G 7/06 | 415/170.1 |
| 2011/0121519 A1 * | 5/2011 | Justak | F01D 11/025 | 277/412 |
| 2011/0293958 A1 * | 12/2011 | Benkoski | C08G 18/755 | 428/560 |
| 2013/0078079 A1 * | 3/2013 | LaPierre | F01D 25/16 | 415/110 |
| 2013/0241153 A1 * | 9/2013 | Garrison | F16J 15/40 | 277/350 |
| 2013/0283757 A1 * | 10/2013 | Bordne | F01D 25/125 | 60/39.08 |
| 2013/0305684 A1 * | 11/2013 | Mastro | F01D 11/003 | 60/39.092 |
| 2014/0099188 A1 * | 4/2014 | Bordne | F01D 25/183 | 415/112 |
| 2014/0300058 A1 * | 10/2014 | Brunet | F01D 11/02 | 277/351 |
| 2014/0334913 A1 * | 11/2014 | Igel | F01D 11/04 | 415/110 |
| 2015/0176425 A1 | 6/2015 | Caulfield et al. | | |
| 2015/0184531 A1 * | 7/2015 | Baptista | F01D 25/16 | 415/230 |
| 2015/0233255 A1 * | 8/2015 | Strock | F01D 11/122 | 60/805 |
| 2015/0275677 A1 * | 10/2015 | Cui | B22D 27/045 | 416/241 R |
| 2015/0308281 A1 * | 10/2015 | Strock | F01D 11/127 | 415/173.4 |
| 2015/0354081 A1 * | 12/2015 | Strock | C25D 11/022 | 416/1 |
| 2015/0377037 A1 * | 12/2015 | Salm | B23K 35/30 | 416/241 R |
| 2016/0003092 A1 * | 1/2016 | Chamberlain | C04B 41/52 | 428/331 |
| 2016/0084168 A1 * | 3/2016 | Amini | B22F 7/08 | 415/173.1 |
| 2016/0305442 A1 * | 10/2016 | Strock | F01D 5/282 | |
| 2016/0312897 A1 * | 10/2016 | Eastman | F16J 15/444 | |
| 2017/0248029 A1 * | 8/2017 | Hafner | F01D 9/041 | |
| 2017/0314468 A1 * | 11/2017 | Wotzak | F02C 3/04 | |
| 2017/0314566 A1 * | 11/2017 | Strock | F04D 29/325 | |
| 2017/0314567 A1 * | 11/2017 | Hansen | F02C 3/04 | |
| 2017/0314571 A1 * | 11/2017 | Strock | F01D 5/20 | |
| 2017/0343111 A1 * | 11/2017 | Ottow | F16C 33/6685 | |
| 2018/0087669 A1 * | 3/2018 | Saha | F01D 11/08 | |
| 2018/0258783 A1 * | 9/2018 | Kirchhoff | C23C 4/01 | |
| 2018/0291814 A1 * | 10/2018 | Anglin | F16C 33/768 | |
| 2018/0340439 A1 * | 11/2018 | Vinski | F01D 25/183 | |
| 2018/0361471 A1 * | 12/2018 | Stoyanov | B22F 1/0059 | |
| 2019/0040959 A1 | 2/2019 | Sommers | | |
| 2019/0093496 A1 * | 3/2019 | Hardikar | F16J 15/4476 | |
| 2019/0186281 A1 * | 6/2019 | Stoyanov | F01D 25/005 | |

* cited by examiner

GAS TURBINE ENGINE INCLUDING SEAL ASSEMBLY WITH ABRADABLE COATING INCLUDING MAGNETIC PARTICLES

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seal assemblies near the rotating shafts contain oil within bearing compartments. Specifically, during operation of the engine, non-rotating seal faces contact rotating seal plates to maintain bearing compartment pressures and keep lubricating oil inside the various bearing compartments.

SUMMARY

A gas turbine engine according to an exemplary aspect of the present disclosure includes, among other things, a compressor section, a combustor section, a turbine section, and at least one rotatable shaft. The engine further includes a seal assembly including a seal plate mounted for rotation with the rotatable shaft and a face seal in contact with the seal plate at a contact area. The seal assembly further includes an abradable coating adjacent the contact area, and wherein the abradable coating includes magnetic particles.

In a further non-limiting embodiment of the foregoing gas turbine engine, the abradable coating includes particles of an alloy.

In a further non-limiting embodiment of any of the foregoing gas turbine engines, the alloy includes iron (Fe).

In a further non-limiting embodiment of any of the foregoing gas turbine engines, the alloy further includes nickel (Ni) and aluminum (Al).

In a further non-limiting embodiment of any of the foregoing gas turbine engines, the alloy further includes chrome (Cr), nickel (Ni), and carbon (C).

In a further non-limiting embodiment of any of the foregoing gas turbine engines, the particles are deposited on at least one of the face seal, the seal plate, and a seal carrier supporting the face seal using a thermal spray coating process.

In a further non-limiting embodiment of any of the foregoing gas turbine engines, the abradable coating includes a solid lubricant.

In a further non-limiting embodiment of any of the foregoing gas turbine engines, the lubricant is hexagonal boron nitride (h-BN) or molybdenum disulfide ($MoS_2$).

In a further non-limiting embodiment of any of the foregoing gas turbine engines, the abradable coating is applied to one or both of a face seal and a seal carrier holding the face seal, the abradable coating is positioned such that, in normal operating conditions, the seal plate does not contact the abradable coating, and the abradable coating is positioned such that, in a worn seal condition, the seal plate contacts the abradable coating and releases at least some particles of the abradable coating.

In a further non-limiting embodiment of any of the foregoing gas turbine engines, the abradable coating is a sacrificial coating.

In a further non-limiting embodiment of any of the foregoing gas turbine engines, the abradable coating is positioned, in normal operating conditions, radially outward of the contact area.

In a further non-limiting embodiment of any of the foregoing gas turbine engines, a bearing assembly is mounted relative to the rotatable shaft, and the seal assembly is adjacent the bearing assembly.

In a further non-limiting embodiment of any of the foregoing gas turbine engines, the face seal is made of a carbon material.

A bearing compartment for a gas turbine engine according to an exemplary aspect of the present disclosure includes, among other things, a bearing assembly and a seal assembly including a seal plate and a face seal in contact with the seal plate at a contact area. The seal assembly includes an abradable coating adjacent the contact area. Further, the abradable coating includes magnetic particles.

In a further non-limiting embodiment of the foregoing bearing compartment, the abradable coating further includes particles of an alloy.

In a further non-limiting embodiment of any of the foregoing bearing compartments, the abradable coating is applied to one or both of a face seal and a seal carrier holding the face seal, the abradable coating is positioned such that, in normal operating conditions, the seal plate does not contact the abradable coating, and the abradable coating is positioned such that, in a worn seal condition, the seal plate contacts the abradable coating and frees at least some magnetic particles of the abradable coating.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
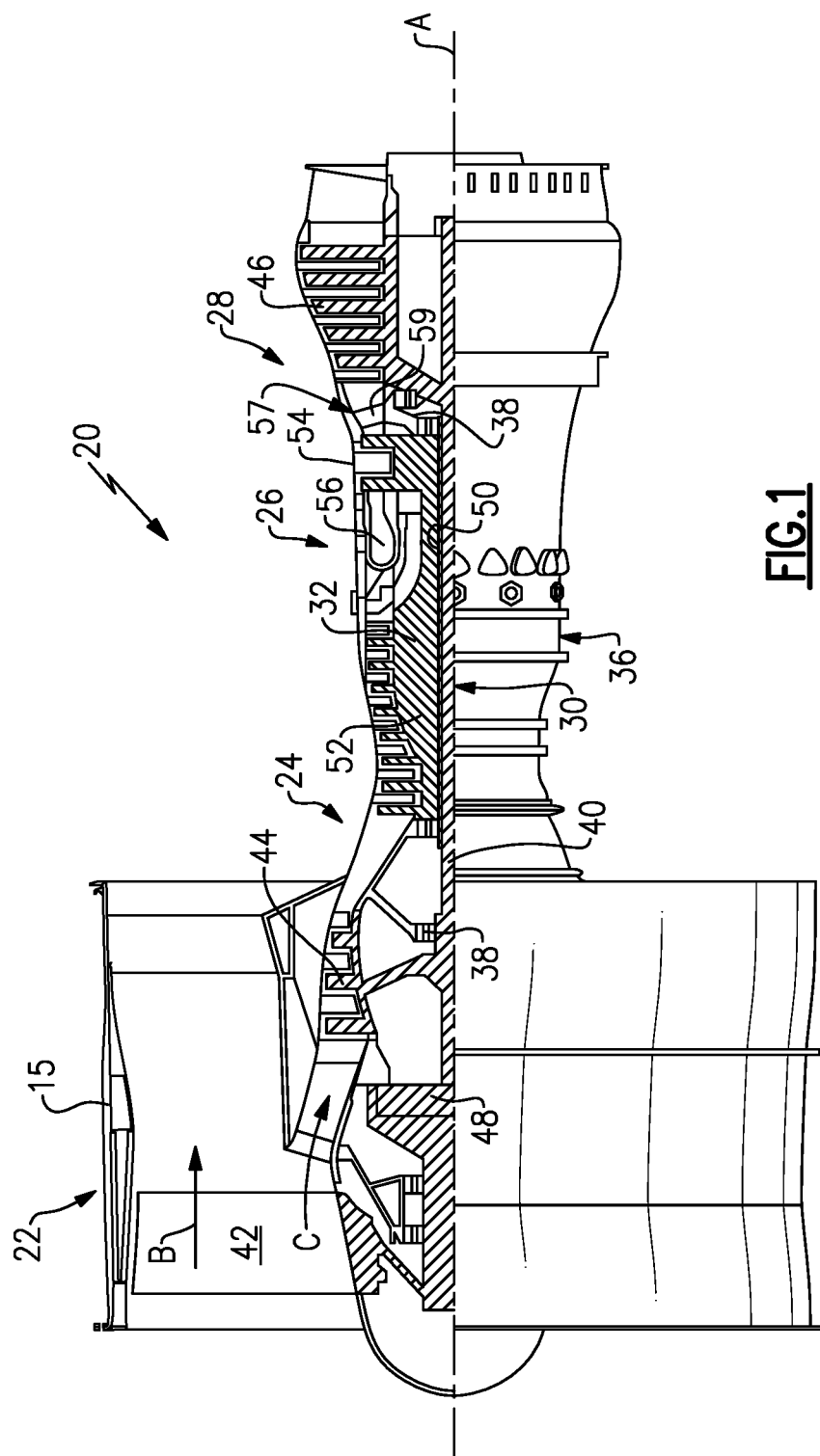
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

Figure 2:
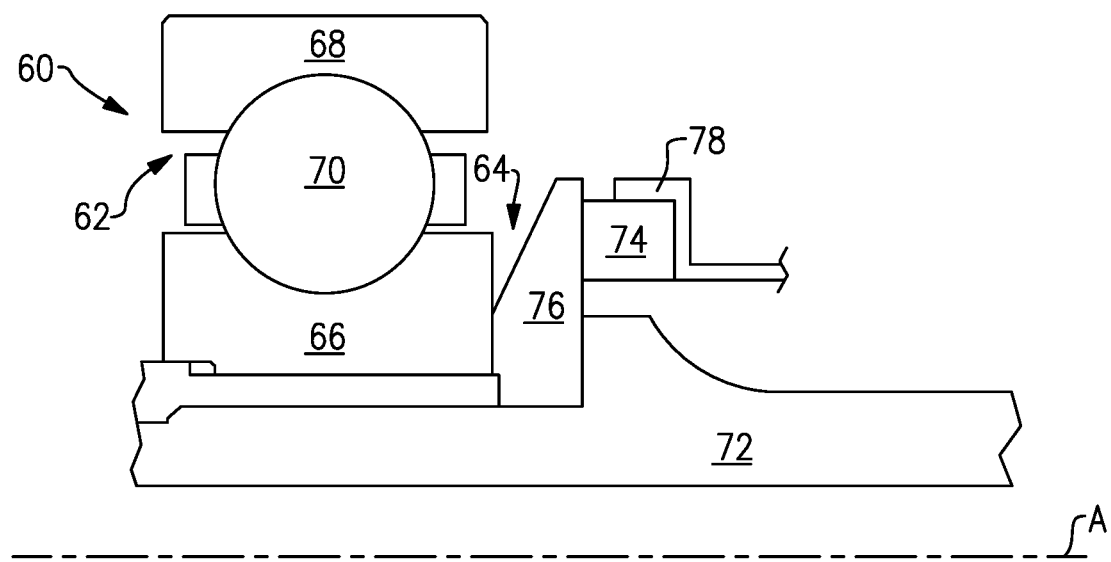
FIG. 2 illustrates a portion of the engine, and in particular illustrates a portion of a bearing compartment, including a bearing assembly and a seal assembly.

FIG. 2 is a partial cross-sectional view of a bearing compartment 60 of the engine 20. While described relative to the engine 20, this disclosure extends to other gas turbine engines other than the one shown in FIG. 1, and also extends to other rotation apparatuses such as power generators. The bearing compartment 60 includes a bearing assembly 62 and a seal assembly 64 adjacent the bearing assembly 62. As is known in the art, the bearing assembly 62 includes an inner race 66, an outer race 68, and rolling elements, such as balls, 70 configured to roll therebetween. The bearing assembly 62 is mounted relative to a shaft 72 of the engine 20.

The bearing compartment 60 is representative of any bearing compartment within the engine 20. Further, the shaft 72 is representative of any shaft within the engine 20, such as the inner shaft 40 or the outer shaft 50. This disclosure is not limited to bearing compartments at any particular engine location. Further, this disclosure applies outside the context of bearing compartments.

The seal assembly 64 includes a face seal 74 and a seal plate 76. In this example, the face seal 74 is mounted to a static structure, namely a seal carrier 78, and therefore does not rotate during operation of the engine 20. The face seal 74 may be made of a carbon (C) material, however other materials come within the scope of this disclosure.

The face seal 74 is biased against, and in direct contact with, the seal plate 76. In particular, either the seal carrier 78 itself is configured to bias the face seal 74 axially toward the seal plate 76, or another structure biases the seal carrier 78, and in turn the face seal 74, axially toward the seal plate 76.

The seal plate 76 is configured to rotate about the engine central longitudinal axis A with the shaft 72. The contact area, namely the region where the face seal 74 directly contacts the seal plate 76, between the face seal 74 and the seal plate 76 ensures that cooling fluid, namely lubricant such as oil, remains within the bearing compartment 60 during operation of the gas turbine engine 20. Over time, the face seal 74 and/or the seal plate 76 may wear. This disclosure relates to detection of such wear. In particular, this disclosure relates to an abradable coating that permits detection of undue wear at the interface between the face seal 74 and/or the seal plate 76.

Figure 3:
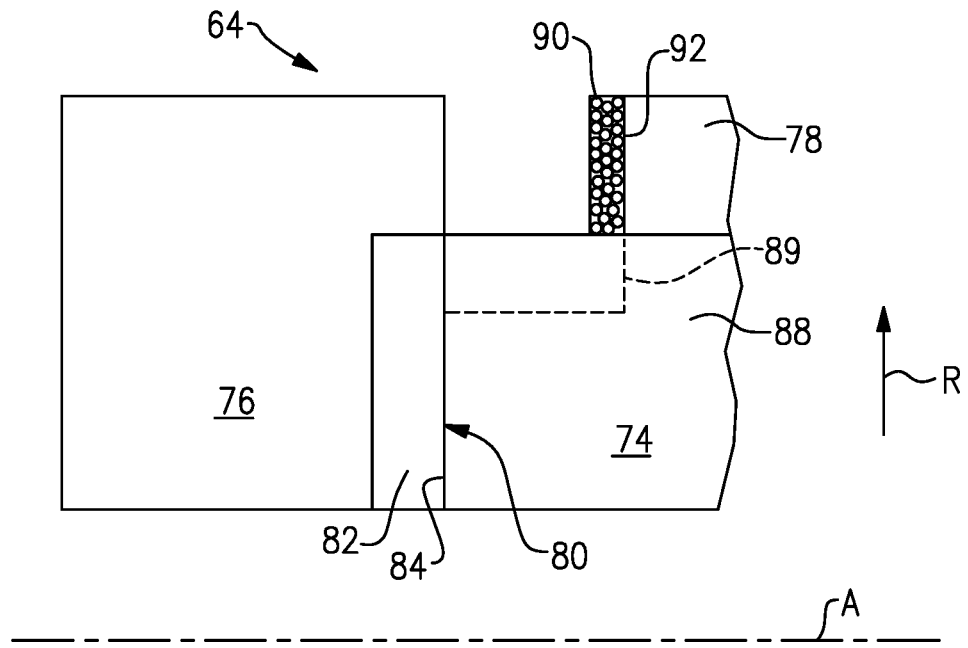
FIG. 3 is a close-up view of the portion of the engine, and in particular illustrates the seal assembly in a normal operating condition.

FIG. 3 is a close-up view of a portion of the bearing compartment 60, and illustrates additional detail of the seal assembly 64. FIG. 3 is representative of a normal operating condition in which the seal plate 76 and the face seal 74 are in direct contact at a contact area 80. In this example, the seal plate 76 includes a hard coating 82, which may include a relatively hard ceramic material such as a chrome carbide ($Cr_3C_2$), and a relatively softer metallic phase such as Co, CoNi, nickel chrome (nichrome), or MCrAlY (where M is Co, Ni or Co/Ni). An example hard coating 82 is tungsten carbide-cobalt (WC—Co), where WC is the hard ceramic material and Co is the binder. The hard coating 82 is configured to directly contact a nose 84 of the face seal 74. The nose 84 is an axial end of a projection 86 of the face seal 74. The projection 86 projects axially toward the seal plate 76 from a main body 88 of the face seal 74. Specifically, the projection 86 projects axially beyond the seal carrier 78. The projection 86 has the same radial dimension as the main body 88 in this example, but the projection 86 could have a radially smaller dimension than the main body 88, represented by the dashed lines in FIG. 3, giving the face seal a backwards L-shape. The term "radially" refers to the radial direction R, which is normal to the engine central longitudinal axis A. The main body 88 is in direct contact with and directly supported by the seal carrier 78.

An abradable coating 90 is applied to an axial end face 92 of the seal carrier 78, in this example. The axial end face 92 faces toward the seal plate 76. In this example, the abradable coating 90 projects axially from the axial end face 92 in a direction toward the seal plate 76. The abradable coating 90 is arranged on the seal carrier 78 radially outward of the projection 86 such that the seal plate 76 does not contact the abradable coating 90 during normal operating conditions. In other words, the contact area 80 is radially spaced-apart from, and in particular radially inward of, the abradable coating 90.

While in FIG. 3 the abradable coating 90 is on the seal carrier 78, the abradable coating 90 could be applied to the face seal 74 in addition to the seal carrier 78 or as an alternative. For example, the projection 86 could exhibit a smaller radial dimension than the main body 88, which again is represented by dashed lines in FIG. 3, and the abradable coating 90 could be applied to an axial end face 89 of the main body 88.

Figure 4:
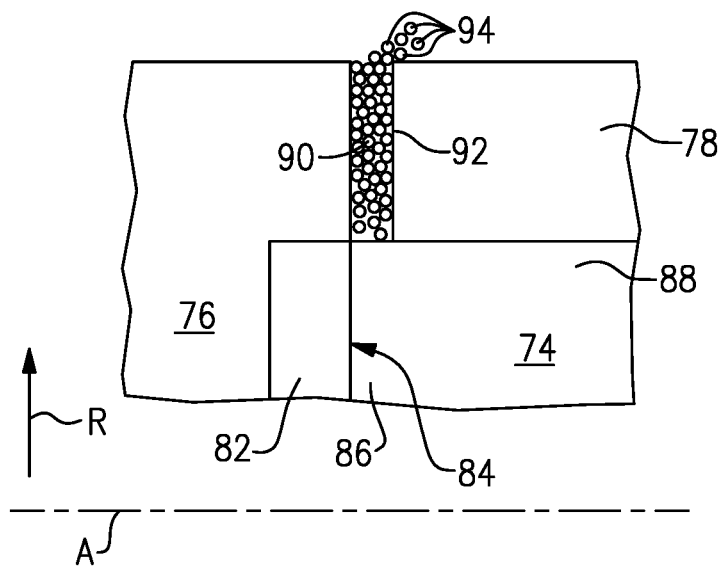
FIG. 4 is a close-up view of the portion of the engine, and in particular illustrates the seal assembly in a worn condition.

FIG. 4 is a view similar to FIG. 3, and illustrates the seal assembly 64 in a worn seal condition. In this condition, the face seal 74 has worn such that the projection 86 exhibits a smaller axial dimension than in FIG. 3. Under the above-discussed bias force, the seal carrier 78 and the main body 88 are axially closer to the seal plate 76 in the worn seal condition of FIG. 4 than in FIG. 3. In particular, in FIG. 4, the face seal 74 has worn to a point where the seal plate 76 is in direct contact with the abradable coating 90. To this end, the seal plate 76 has an outer diameter such that the seal plate 76 and seal carrier 78 are radially aligned. The abradable coating 90 is configured such that contact between the abradable coating 90 and the seal plate 76 will free some particles of the abradable coating 90.

In FIG. 4, a plurality of particles, illustrated at 94, have been freed from the remainder of the abradable coating 90 and have been released radially outwardly into the bearing compartment 60, where the freed particles 94 intermix with the lubricant in the bearing compartment 60. The abradable coating 90, and the freed particles 94, contains material which can be used by another system of the engine 20, such as an on-line detection monitor, which is a sensor configured to detect the presence of magnetic particles in oil, to determine that the seal assembly 64 has worn. Thus, the abradable coating 90 is not configured to resist release of such particles when brought into direct contact with the seal plate 76. In this regard, the abradable coating 90 may be referred to as a sacrificial coating.

The abradable coating 90, in this disclosure, includes a binder that holds the coating together, magnetic particles, and lubricants. The abradable coating 90 may also include a polyester material which is removed to create a porosity. These aspects of the abradable coating 90 will now be described in more detail.

In one example, the abradable coating 90 includes magnetic particles within a binder of particles of a metal alloy. Alternatively, the binder may be ceramic. The particles forming the abradable coating 90 are deposited on the seal carrier 78, in this example, using a process such as air plasma spraying (APS) or flame spraying (FS), or by another type of thermal spraying technique such as a high velocity oxygen fuel (HVOF) coating process or another similar process. In an example, the magnetic particles may include iron (Fe), iron oxides (Ferric oxide $Fe_2O_3$ and magnetite $Fe_3O_4$), actinide ferromagnets, Alnico alloy (an iron alloy with aluminum, nickel and cobalt), Yttrium iron garnet ($Y_3Fe_2(FeO_4)_3$ or $Y_3Fe_5O_{12}$). Further, the alloy may include iron (Fe). In a further example, the alloy further includes nickel (Ni) and aluminum (Al). In that example, the alloy includes, by atomic weight, 35% nickel (Ni), 6% aluminum (Al), and a balance of iron (Fe). Another example alloy includes, in addition to iron (Fe), chrome (Cr), nickel (Ni), and carbon (C). Specifically, that alloy includes, by atomic weight, 18% chrome (Cr), 2% nickel (Ni), 0.2% carbon (C), and a balance of iron (Fe).

In another aspect of this disclosure, in order to increase the ease of releasing the particles 94, the abradable coating 90 may be formed such that it is porous. In this example, the alloy is initially deposited with a polyester material. The deposited alloy-polyester mixture is then heated to remove all or substantially all of the polyester material. In this respect, the polyester material is not intended to hold the alloy particles together or to adhere the alloy particles to the seal carrier 78, for example. Rather, the function of the polyester particles is to provide the abradable coating with a porous cross-section.

In yet another aspect of this disclosure, in order to increase the ease of releasing the particles 94, the abradable coating 90 may include a lubricant, such as a solid lubricant. Examples of such lubricants include hexagonal boron nitride (h-BN), molybdenum disulfide ($MoS_2$), or graphite. The addition of lubricant may assist the seal plate 76 in breaking down the abradable coating 90.

The abradable coating 90 of the present disclosure is configured to maintain its structural integrity at relatively high operating temperatures as compared to polymer-based abradable coatings, without it being unduly difficult for the seal plate 76, for example, to liberate particles of the abradable coating 90 in a worn seal condition.

It should be understood that terms such as "axial" and "radial" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms. Additionally, while many components of the engine 20 are shown in cross-section in the figures, it should be understood that certain of these components extend circumferentially around the engine central longitudinal axis A.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising: a compressor section, a combustor section, a turbine section, and at least one rotatable shaft; and a seal assembly including a seal plate mounted for rotation with the rotatable shaft and a face seal in contact with the seal plate at a contact area, wherein the seal assembly includes an abradable coating adjacent the contact area, and wherein the abradable coating includes magnetic particles, wherein, in normal engine operating conditions, an axial end face of the seal plate and an axial end face of the face seal are in direct contact at the contact area, and wherein, in normal engine operating conditions, the abradable coating is adjacent the contact area and is radially outward of the contact area.

2. The gas turbine engine as recited in claim 1, wherein the abradable coating includes particles of an alloy.

3. The gas turbine engine as recited in claim 2, wherein the alloy includes iron (Fe).

4. The gas turbine engine as recited in claim 3, wherein the alloy further includes nickel (Ni) and aluminum (Al).

5. The gas turbine engine as recited in claim 3, wherein the alloy further includes chrome (Cr), nickel (Ni), and carbon (C).

6. The gas turbine engine as recited in claim 1, wherein the particles are deposited on at least one of the face seal, the seal plate, and a seal carrier supporting the face seal using a thermal spray coating process.

7. The gas turbine engine as recited in claim 1, wherein the abradable coating includes a solid lubricant.

8. The gas turbine engine as recited in claim 7, wherein the lubricant is hexagonal boron nitride (h-BN) or molybdenum disulfide ($MoS_2$).

9. The gas turbine engine as recited in claim 1, wherein: the abradable coating is applied to one or both of a face seal and a seal carrier holding the face seal, the abradable coating is positioned such that, in normal engine operating conditions, the seal plate does not contact the abradable coating, the abradable coating is positioned such that, in a worn seal condition, the seal plate contacts the abradable coating and releases at least some particles of the abradable coating, and the abradable coating is a sacrificial coating.

10. The gas turbine engine as recited in claim 9, further comprising a sensor configured to detect a presence of at least some of the released magnetic particles in lubricant.

11. The gas turbine engine as recited in claim 1, further comprising:
a bearing assembly mounted relative to the rotatable shaft, wherein the seal assembly is adjacent the bearing assembly.

12. The gas turbine engine as recited in claim 1, wherein the face seal is made of a carbon material.

13. The gas turbine engine as recited in claim 1, wherein, in normal engine operating conditions, within the contact area the axial end face of the seal plate and the axial end face of the face seal are both substantially planar, smooth surfaces.

14. The gas turbine engine as recited in claim 1, wherein, in normal engine operating conditions: the axial end face of the seal plate is either an aft-most or a fore-most surface of the seal plate, and the axial end face of the face seal is either an aft-most or a fore-most surface of the face seal.

15. A bearing compartment for a gas turbine engine, comprising: a bearing assembly; and a seal assembly including a seal plate and a face seal in contact with the seal plate at a contact area, wherein the seal assembly includes an abradable coating adjacent the contact area, and wherein the abradable coating includes magnetic particles, wherein, in normal engine operating conditions, an axial end face of the seal plate and an axial end face of the face seal are in direct contact at the contact area, and wherein, in normal engine operating conditions, the abradable coating is adjacent the contact area and is radially outward of the contact area.

16. The bearing compartment as recited in claim 15, wherein the abradable coating further includes particles of an alloy.

17. The bearing compartment as recited in claim 16, wherein: the abradable coating is applied to one or both of a face seal and a seal carrier holding the face seal, the abradable coating is positioned such that, in normal engine operating conditions, the seal plate does not contact the abradable coating, and the abradable coating is positioned such that, in a worn seal condition, the seal plate contacts the abradable coating and frees at least some magnetic particles of the abradable coating.

* * * * *